(12) United States Patent
Webert

(10) Patent No.: US 6,419,268 B1
(45) Date of Patent: Jul. 16, 2002

(54) INFLATABLE AIRBAG MODULE FOR AN AIRBAG UNIT

(75) Inventor: Thomas Webert, Habichtsthal (DE)

(73) Assignee: Takata-Petri AG, Aschaffenberg (DE)

( * ) Notice: Subject to any disclaimer, the term of this patent is extended or adjusted under 35 U.S.C. 154(b) by 0 days.

(21) Appl. No.: 09/986,652

(22) Filed: Nov. 9, 2001

Related U.S. Application Data

(63) Continuation of application No. PCT/DE00/01525, filed on May 11, 2000, now abandoned.

(30) Foreign Application Priority Data

May 12, 1999 (DE) .......................................... 199 22 994

(51) Int. Cl.⁷ .............................................. B60R 21/22
(52) U.S. Cl. .................. 280/743.2; 280/730.2
(58) Field of Search ........................... 280/730.2, 730.1, 280/743.2, 743.1, 728.1, 749

(56) References Cited

U.S. PATENT DOCUMENTS 3,836,168 A   9/1974   Nonaka et al.
5,335,936 A   8/1994   Faigle et al.

FOREIGN PATENT DOCUMENTS

| DE | 196 54 490 A1 | 6/1998 |
| DE | 197 07 347 A1 | 9/1998 |
| DE | 197 24 191 A1 | 12/1998 |
| JP | 03 248944 A | 11/1991 |

Primary Examiner—Peter C. English
(74) Attorney, Agent, or Firm—Foley & Lardner

(57) ABSTRACT

An inflatable airbag for an airbag unit with at least one tensioning cord which can be fixed to the vehicle body. The cord can be tensioned when the airbag is inflated and limits the spreading of the airbag during inflation. The tensioning cord engages with the airbag in at least one area over at least one pair of adhesive surfaces comprising two surface elements in the form of a hook surface and a counter surface. One of the surfaces is allocated to the airbag and the other surface is allocated to the tensioning cord. The surfaces glide past each other during a relative movement along a first direction when the airbag is inflated. The surfaces engage with each other when relative movement along a second direction which is substantially opposite to the first direction occurs after inflation.

17 Claims, 9 Drawing Sheets

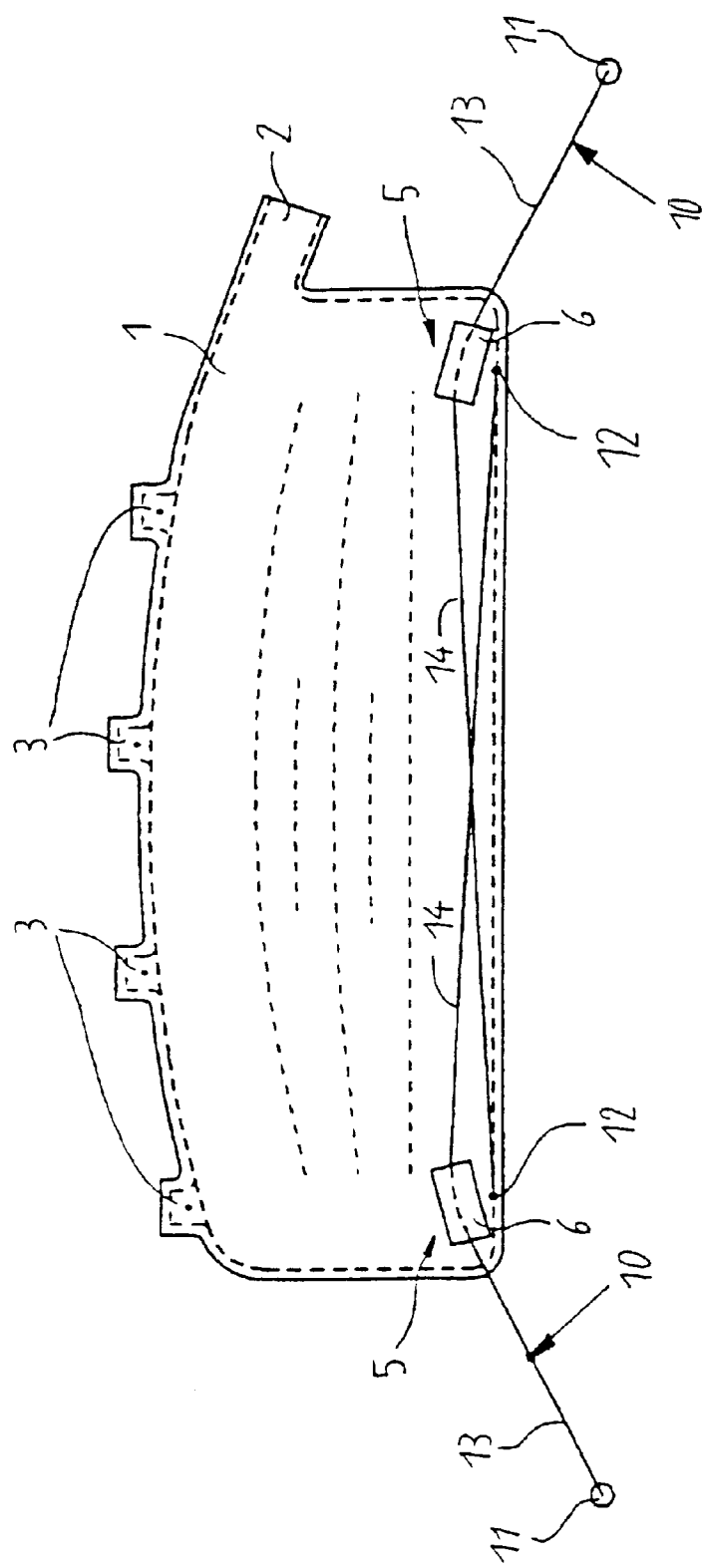

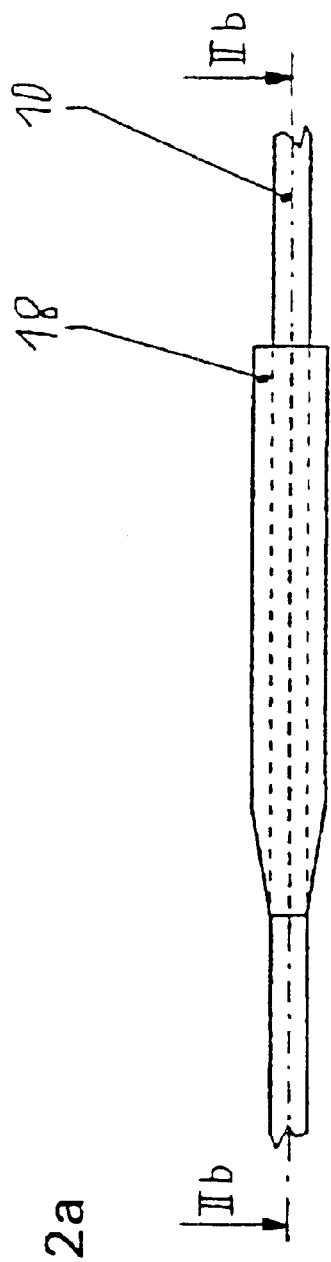
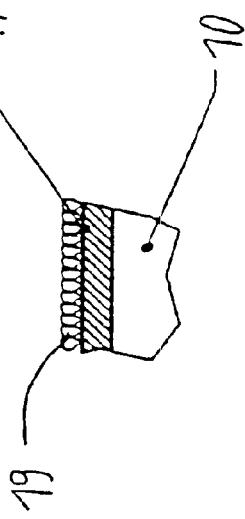
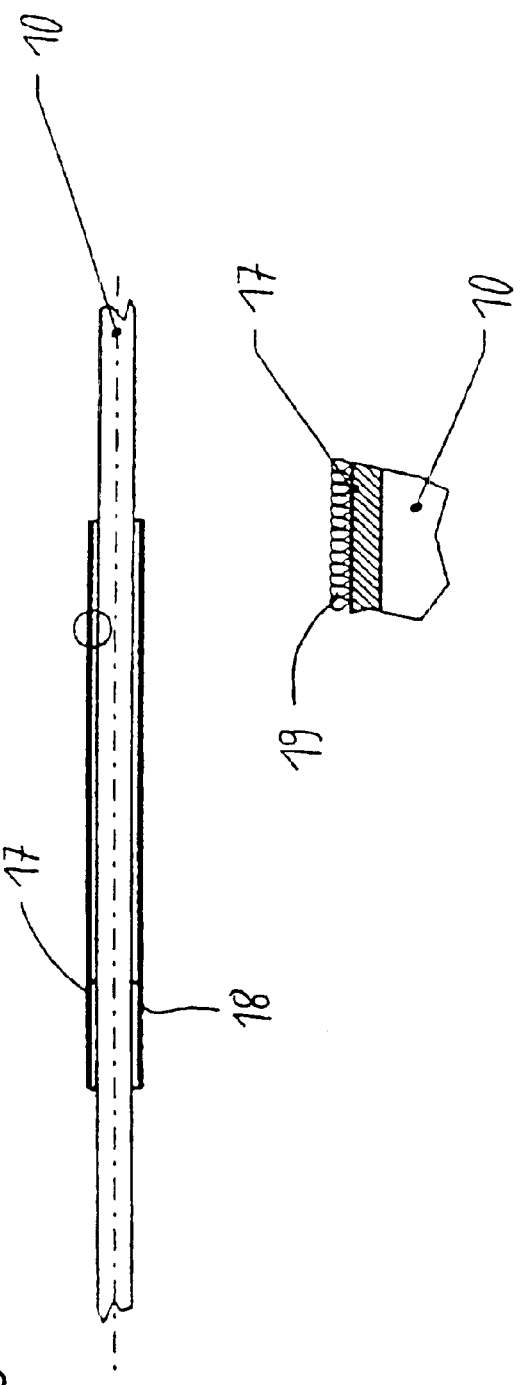
Fig. 2a
Fig. 2b
Fig. 2c

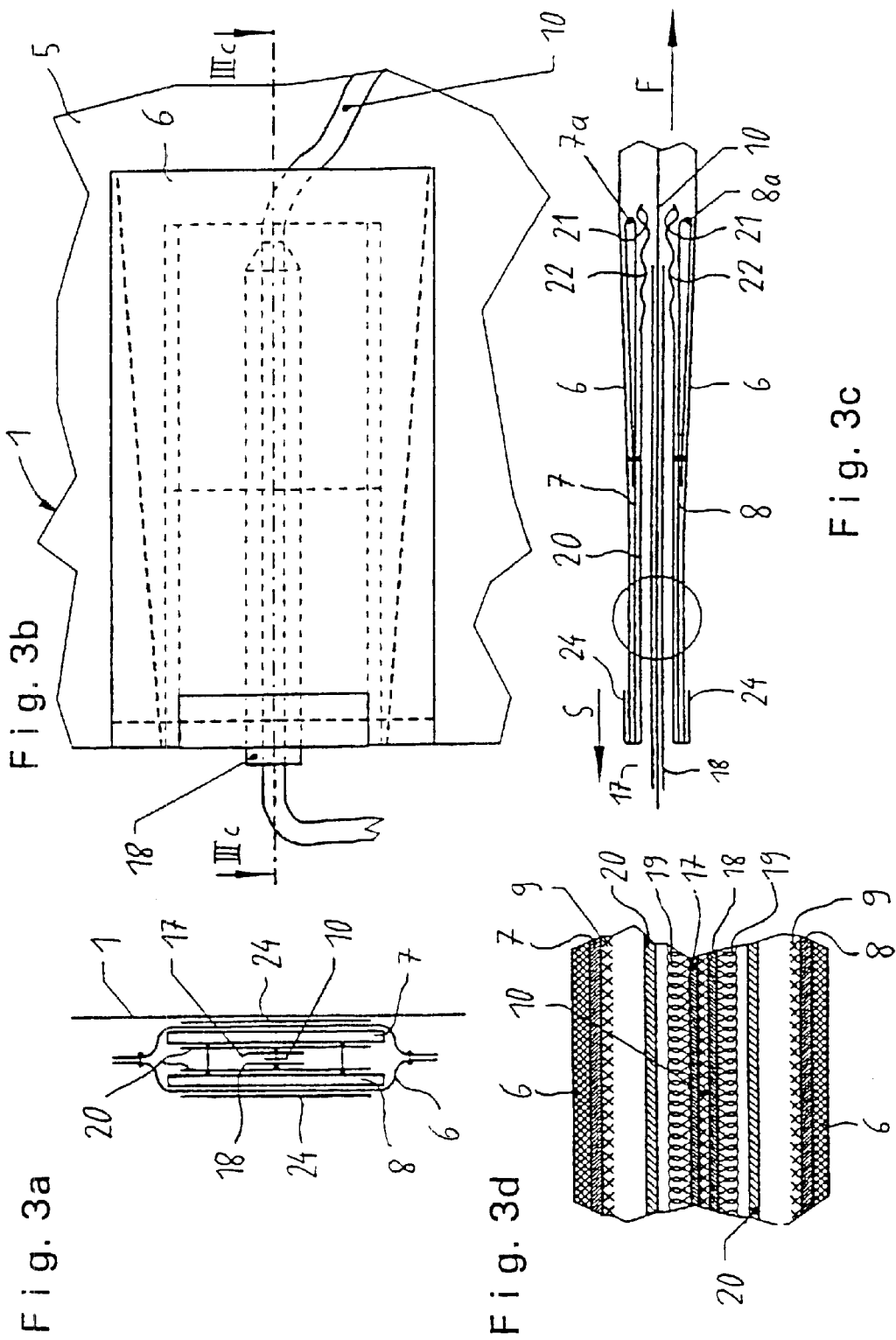

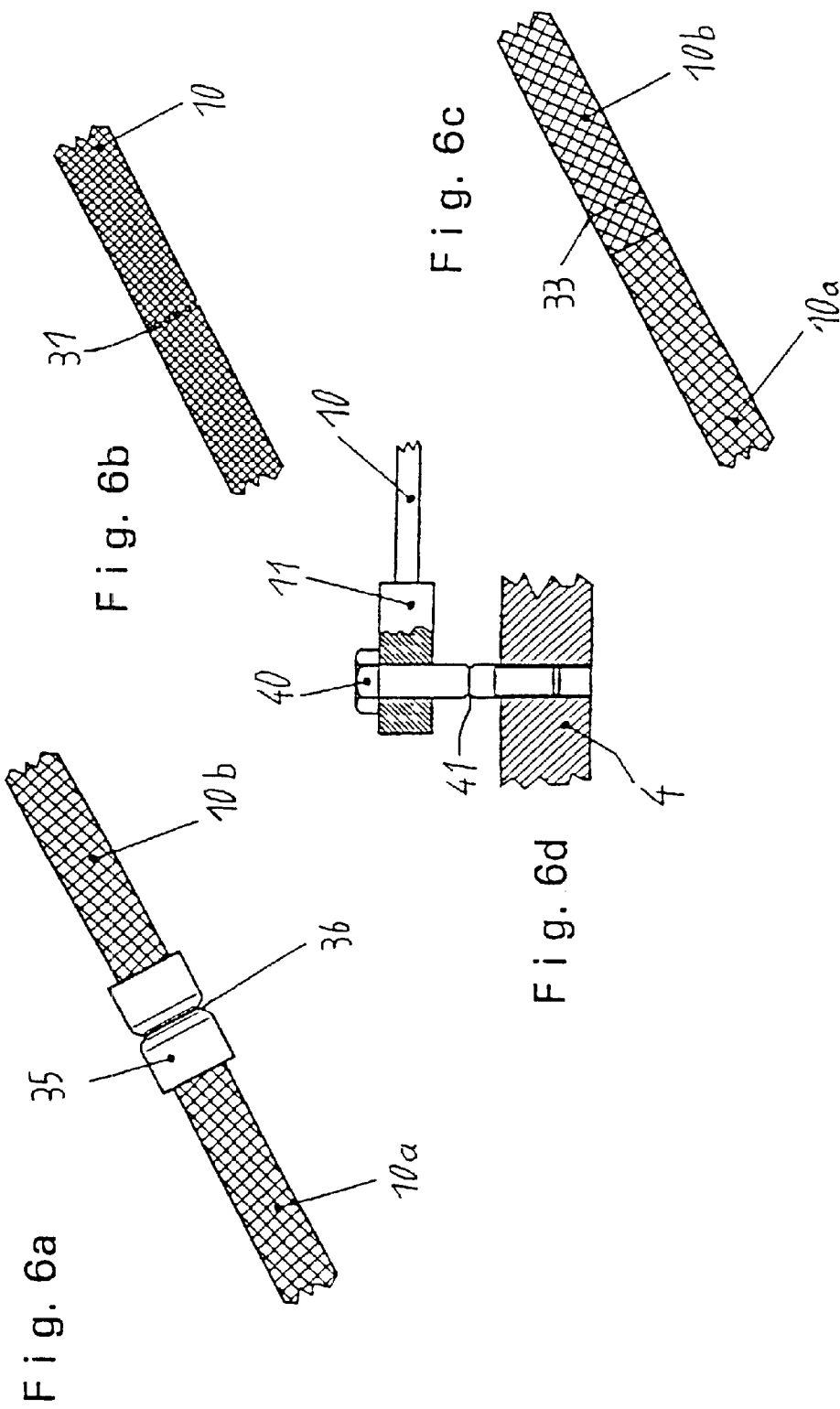

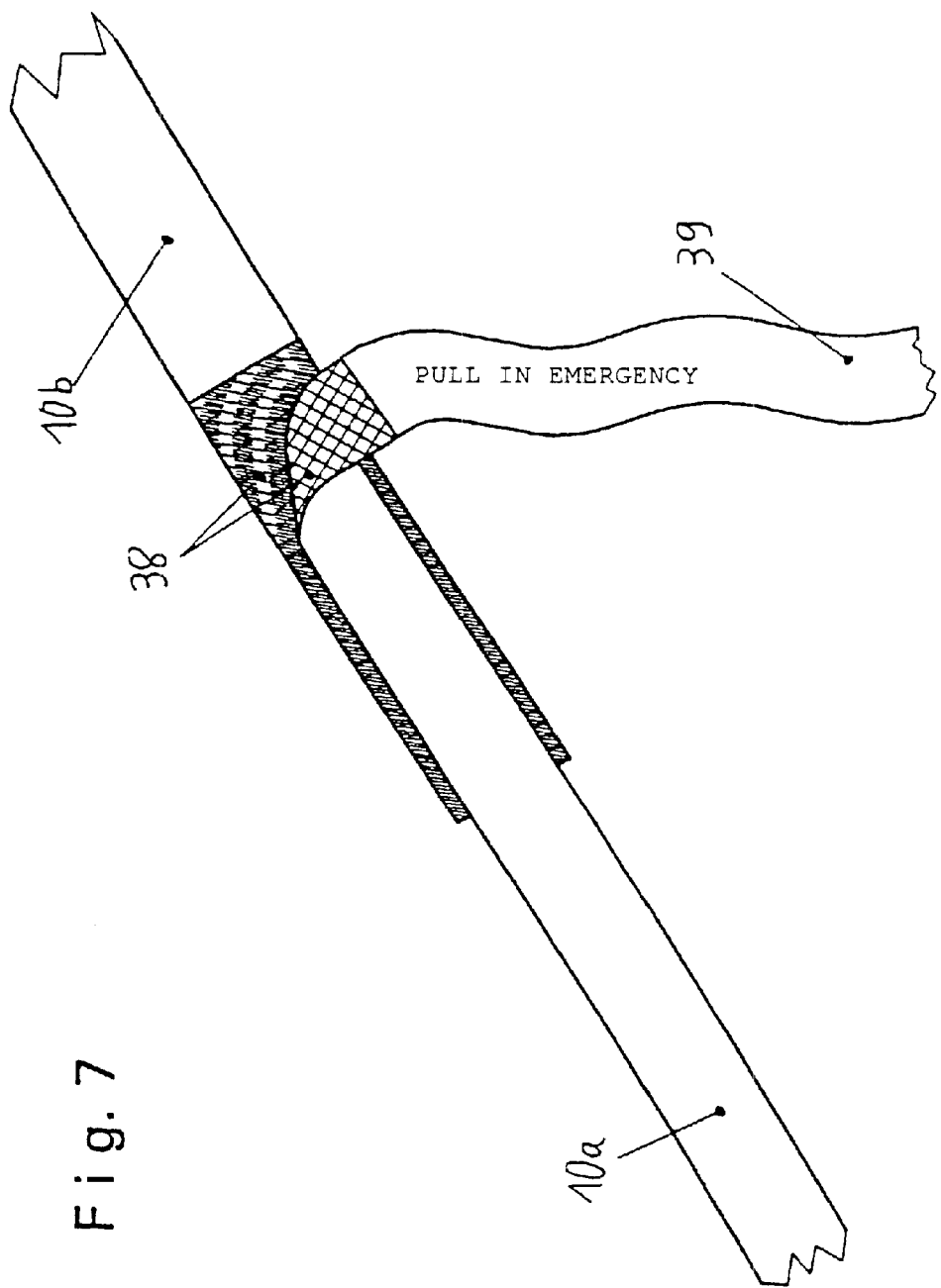

INFLATABLE AIRBAG MODULE FOR AN AIRBAG UNIT

CROSS-REFERENCE TO RELATED APPLICATIONS

This is a continuation of International Application PCT/DE00/01525, which has an international filing date of May 11, 2000, now abandoned; this International Application was not published in English, but was published in German as WO 00/68042.

BACKGROUND

The invention relates to an inflatable airbag for an airbag unit having at least one tautening cord fastened to the vehicle body and operatively connected to the airbag, so that spread of the airbag during inflation is limited.

DE 196 54 490 A1 describes an airbag for a lateral airbag unit of preferably tube-like shape, said airbag being connected at least two points to the motor vehicle body and, in the uninflated state, being accommodated in a curved stowage space. Furthermore, between the airbag and a fastening point on the motor vehicle, at least one elongate tautening or tensioning element (designated hereafter as a tautening cord) is provided, which can be tautened when the airbag is inflated. The spread of the airbag during inflation is thereby limited.

Moreover, it is possible, by means of such a tautening cord, to prevent the situation where, in the event of a crash, vehicle occupants are thrown out of the vehicle through an open window or a window destroyed in the crash or where, after a crash, individual body parts of a vehicle occupant project through a window and therefore undergo the risk of correspondingly serious injury. For this purpose, however, it is necessary, in the event of a crash, for the tautening cord to remain tensioned even after the inflation of the airbag.

DE 197 07 347 A1 discloses an inflatable airbag for an airbag unit, with at least one tautening cord which can be fastened to a vehicle body and can be tautened during the inflation of the airbag and which limits the spread of the airbag during inflation. The tautening cord is operatively connected to the airbag in at least one region via a return stop (when the airbag unit is installed in a motor vehicle). As a result, during the inflation of the airbag, the tautening cord and the airbag can move relative to one another in a first direction in this region. After the inflation of the airbag, relative movement of the tautening cord and airbag in a second direction essentially opposite to the first direction is prevented. The return stop includes two wedges, one is a fixed wedge and is provided with grooves on its wedge face and the other is mounted movably by means of a tension spring. Although this return stop functions very reliably and safely, it nevertheless has a comparatively high weight and requires a corresponding large amount of space.

One problem on which the invention is based is to provide an inflatable airbag with a tautening cord of which remains in a tensioned state by simple means even after the inflation of the airbag.

SUMMARY

This object is achieved, according to the invention, by the provision of an airbag for an airbag unit having a taunting cord fastened to a vehicle body. The taunting cord is operatively connected to the airbag to limit the spread of the airbag during inflation. The tautening cord is connected to the airbag so that during inflation the tautening cord and the airbag can move relative to one another in a first direction. After inflation, relative movement between the tautening cord and the airbag in a second direction generally opposite to the first direction is prevented.

There is provision for the tautening cord and the airbag to cooperate via at least one pair of adhesive faces and for the pair of adhesive faces to comprise two deformable face elements in the form of a hook face and of a counter-face. One of the faces is assigned to the airbag and the other to the tautening cord. The faces slide past one another during the relative movement in the first direction, while they come into engagement with one another during the relative movement in a second direction.

The airbag unit according to the invention can be implemented by cost-effective means. In addition, the airbag unit does not require the use of heavy parts which, in the event of a crash, could lead to injuries to a vehicle occupant.

A return stop may be formed by a pair of adhesive faces (in the manner of a touch-and-close fastening) which comprises two elastic deformable face elements in the form of a hook face and of a counterface.

The two face elements assigned to the airbag and to the tautening cord, may, in this case, have both a different reach and an identical reach in the direction of extent of the tautening cord. In one case, the face element assigned to the tautening cord may extend over a relatively long length, in particular essentially over the entire length of the tautening cord, in order to ensure a reliable engagement of the two face elements during a return movement.

According to one alternative of the invention, there is provision for the hooks of the hook face to run at an inclination to the counterface in such a way that they slide over the counterface during the relative movement in the first direction, while they engage into the counterface during the relative movement in the second direction.

According to another alternative of the invention, a sliding element runs between the hook face and the counterface. The sliding element allows for a relative movement of the two face elements. The sliding element may include an abutment on which one of the face elements acts during a relative movement in the second direction (return movement after the inflation of the airbag), in such a way that the sliding element is deformed and the two face elements (hook face and counterface) can come into engagement with one another.

Preferably, when the airbag is in the folded state, the sliding element lies, in the vicinity of its abutment, on the face element assigned to the tautening cord. During the inflation of the airbag, the face element assigned to the tautening cord can be guided behind the sliding element. During the return movement after the inflation of the airbag, the face element assigned to the tautening cord can run onto the abutment of the sliding element.

The sliding element itself is preferably a sliding sleeve which surrounds the tautening cord and has an abutment which makes it easier for the sliding element to experience deformation.

The return of the tautening cord after the inflation of the airbag is prevented in a particularly reliable way if the tautening cord has arranged on it two face elements, of which the surfaces provided with adhesive elements face in opposite directions and which are each assigned a face element on the airbag. The surface of the airbag may be provided with a pocket, in which the face elements assigned to the airbag are arranged and in which that portion of the tautening line which is provided with the face element extends.

When the tautening cord is firmly connected to the airbag at a point on the latter and is operatively connected to said airbag at a distance from this point, in another region, via the above-explained return stop (that is to say, for example, via a pair of adhesive faces), then, during inflation, the airbag can be tautened by means of the tautening cord between said fastening point and the return stop, the return stop ensuring that the tension of the tautening cord and of the airbag is maintained even after the inflation of the airbag.

According to the present invention, the tautening cord remains tensioned even after the inflation of the airbag. Thus, it may become difficult (in the case of a lateral or side airbag) for a vehicle occupant to open the vehicle door or even to leave the vehicle through a side window after an accident. Rescue work, in which there is to be access to the vehicle through a vehicle door or a window, may be impeded as a result.

In order to eliminate these disadvantages, the tautening cord includes a means for removing the tension from the tautening cord.

There may be provision for the tautening cord or a fastening means, which serves for fastening the tautening cord, to have a weakening region. The weakening region can withstand the forces occurring during the inflation of the airbag but also removes the tension from the tautening cord when specific predeterminable forces are exerted. The weakening region may be designed, as a predetermined breaking point which breaks when a defined force is applied.

In order to form the predetermined breaking point, for example, the tautening cord may be perforated or may consist of two parts which are connected to one another via a further structural element provided with a predetermined breaking point. Finally, the predetermined breaking point may also be provided in a fastening element for connecting the tautening cord to the airbag or to the vehicle body.

Instead of a weakening region being provided, a releasable fastening means may be used. The fastening means is used to connect the tautening cord to the vehicle body or for connecting two parts of the tautening cord to one another. This fastening means is released after a crash, in order to remove the tension from the tautening cord. A suitable releasable fastening means is, for example, a touch-and-close fastening.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 1 shows a lateral airbag with two tautening cords;

FIG. 2a shows a side view of a tautening cord with two adhesive faces;

FIG. 2b shows a longitudinal section along line IIb—IIb through the tautening cord from FIG. 2a;

FIG. 2c shows a detail from FIG. 2b;

FIG. 3a shows a cross section through a portion of an airbag which is provided with a pocket in which the airbag and a tautening cord cooperate via a pair of adhesive faces;

FIG. 3b shows a top view of the portion of the airbag from FIG. 3a;

FIG. 3c shows a longitudinal section along line IIIc—IIIc through the portion of the airbag from FIG. 3b;

FIG. 3d shows a detail from the illustration according to FIG. 3c;

FIG. 5b shows a section along line Vb—Vb through the illustration according to FIG. 5a;

FIG. 6a shows a two-part tautening cord, the two parts of which are connected to one another via a plastic element which has a predetermined breaking point;

FIG. 6b shows a tautening cord with a perforation;

FIG. 6c shows a two-part tautening cord, the two parts of which are connected to one another via a seam;

FIG. 6d shows a fastening point at which a tautening cord is connected to the body of a motor vehicle; and FIG. 7 shows a two-part tautening cord, the two parts of which are connected to one another via a touch-and-close fastening.

DESCRIPTION

Figure 4A:
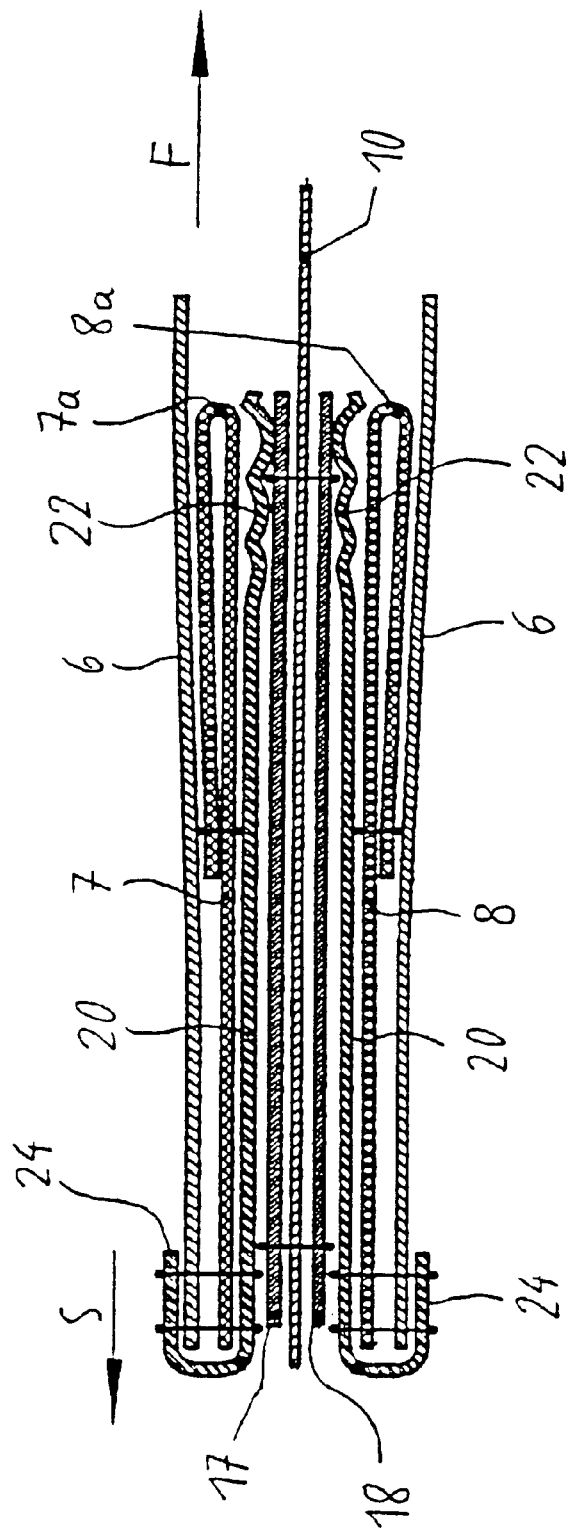
FIGS. 4a–4c show the interaction of the airbag and of the tautening cord from FIGS. 3a to 3d during the inflation of the airbag and thereafter.

FIG. 1 illustrates an airbag of a lateral airbag unit in the inflated state. The airbag 1 comprises an injection orifice 2, through which gas can be introduced into the airbag 1 in the event of a crash by means of a gas generator. A plurality of fastening points 3 for fastening the airbag to the body above a motor vehicle door are also provided.

In each of its two lower lateral end portions 5, the airbag has a pocket 6, in which a tautening cord 10 is guided. The two tautening cords 10 are connected at one end to the vehicle body via a fastening point 11 and at their other end are fastened to the airbag 1 via a fastening point 12. The airbag-side fastening point 12 of each tautening cord 10 is located in the lower lateral end region 5 of the airbag 1. The pocket 6 for the other tautening cord 10 is also provided in the region. The location of the fastening points 11, 12 and the pockets 6 cause the tautening cords 10 to cross over one another above the airbag 1. Furthermore, each tautening cord 10 is subdivided by the pockets 6 into a first portion 13, which extends from the vehicle-side fastening point 11 as far as the pocket 6, and into a second portion 14, which extends from the pocket 6 to the airbag-side fastening point 12.

The tautening cords 10 were automatically tensioned during the inflation of the airbag 1. As a result, the airbag 1 was shortened and its reach limited. More detailed particulars with regard to this may be gathered from DE 196 54 490 A1 (incorporated by reference herein) which describes in detail how the reach of an airbag can be limited by means of a tautening cord which is tensioned automatically during the inflation of the airbag.

According to the present invention, in order to maintain the tension of the tautening cords 10 after the inflation of the airbag 1, return stops are provided in the pockets 6. In these pockets 6, the tautening cords 10 are operatively connected to the airbag 1 by a pair of adhesive faces, as will be explained in detail below with reference to FIGS. 2a to 5c.

FIGS. 2a to 2c illustrate a portion of a tautening cord 10 on which are attached two face elements 17, 18 which cooperate (see FIGS. 3a to 3d) with face elements 7, 8 attached to the pocket 6. As shown in FIG. 2c, each face element 17, 18 includes an adhesion face 19 facing away from the cord 10. The face elements 17, 18 may be integrally connected into a pipe or tube shape. The adhesion face corresponds to a loop surface used for "hook and loop" fasteners or "touch fasteners" (e.g. VELCRO®).

With regard to the actual geometric configuration of the face elements illustrated in FIGS. 2a to 2c, a multiplicity of variants may be employed. In particular, a pipe-shaped or tube-like design may be considered.

FIGS. 3a to 3d illustrate from FIG. 1 a lateral end region 5 of the airbag 1, said end region being provided with a pocket 6, the pocket 6 having extending through it that portion of a tautening cord 10 which is illustrated in FIGS. 2a to 2c.

The pocket 6 is fastened to the airbag 1 and is provided on each of two inner surfaces located opposite one another with a face element 7, 8 on which a multiplicity of hooks 9 are arranged. The two face elements 7, 8 of the pocket 6 are in each case located opposite a face element 17 or 18 of the tautening cord 10, the hooks 9 of each of the face elements 7, 8 being assigned a correspondingly configured adhesive face 19 of the face element 17, 18, so that the face elements 7, 17 and 8, 18 in each case form a pair of adhesive faces which are configured in the manner of "hook and loop" fasteners. As an alternative, the face elements provided with the hooks 9 could be provided on the tautening cord 10 and the loop faces 19 be assigned correspondingly to the insides of the pocket 6. As shown in FIG. 4a each face element 7, 8 is folded or wrapped back at an end portion 7a, 8a.

As shown in FIGS. 3a–3d, the fastening faces 7, 17 and 8, 18 are not in direct contact with one another, because the tautening cord 10 is surrounded by a sliding sleeve 20. The sleeve 20 has a first end 24 that extends out of the pocket 6 and is folded back to cover one end of the pocket 6 as shown in FIGS. 3b and 3c. The sleeve 20 separates the hook 7, 8 and loop 17, 18 faces from each other. The tautening cord 10 can therefore easily be displaced within the sliding sleeve 20 in the free-running direction F, so that the tautening cord 10 can be tensioned during the inflation of the airbag 1.

Figure 4B:
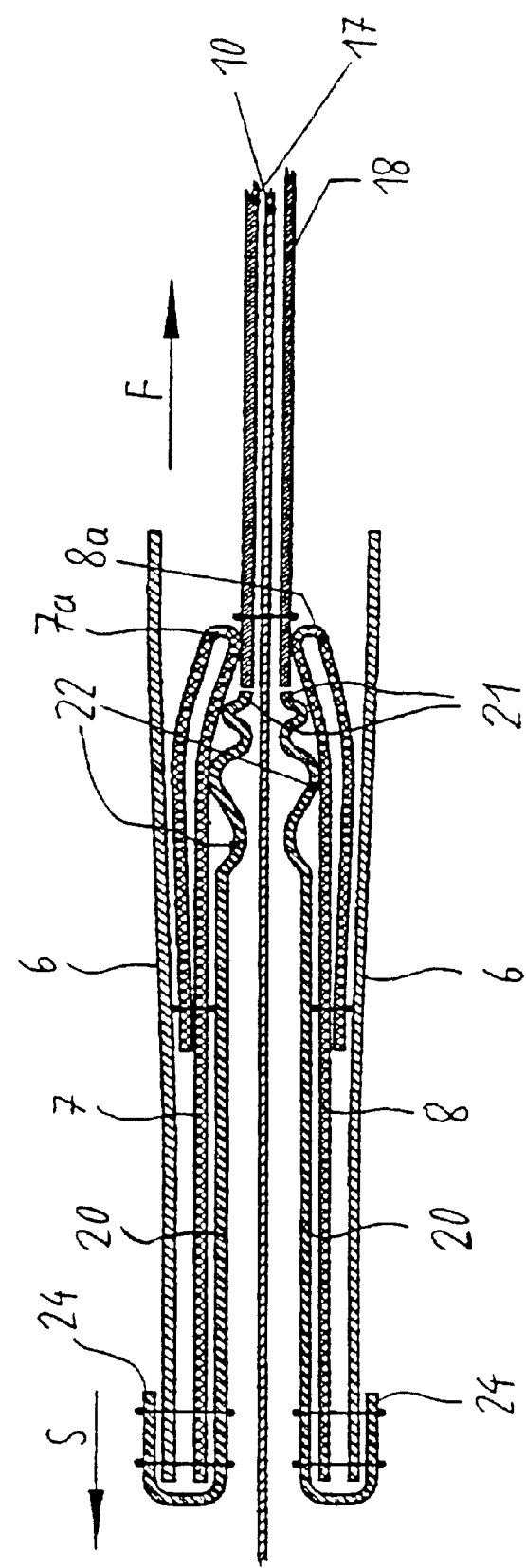
Figure 4C:
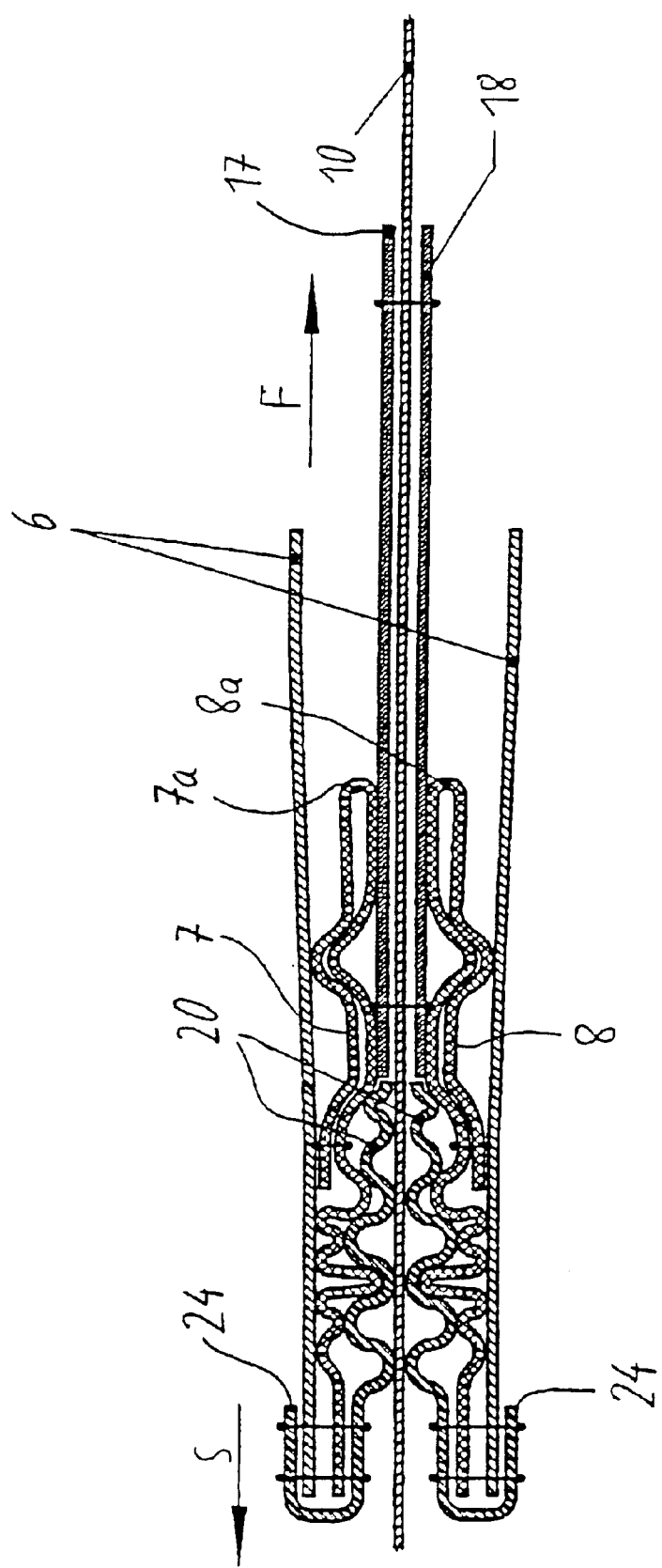

The sliding sleeve 20 has second end 22 at the other end from the folded portion 24. The second end portion 22 is illustrated as being wavy in FIG. 3c. The end 22 forms in abutment 21 for the tautening cord. The function of the abutment 21 will be explained further below with reference to FIGS. 4a to 4c. The wavy illustration of the end portion 22 in FIGS. 4a to 4c is intended to symbolize the deformability of the end portion 22. In practice, the second end 22 will not normally be deformed prior to the inflation of the airbag. In the region of the end portion 22 of the sliding sleeve 20, the two face elements 7, 8 of the pocket 6 rest with their respective end portions 7a, 8a on the sliding sleeve 20 and press the sleeve 20 with its end portion 22 against the face elements 17, 18 of the tautening cord 10. The sliding sleeve 20 accordingly prevents contact between the face elements 7, 8 of the pocket 6, which are provided with hooks 9, and the associated face elements 17, 18 of the tautening cord 10 which are provided with loops 19.

As described further below, with reference to FIGS. 4a to 4c, during the inflation of the airbag 1, the tautening cord 10 is tensioned by means of movement in the free-running direction F and, after the inflation of the airbag 1, an opposite movement of the tautening line 10 relative to the airbag 1 in the direction S is prevented.

FIG. 4a shows the position of the tautening cord 10 in the pocket 6 of the airbag at an early moment during the inflation of the airbag. This is essentially an enlarged illustration of FIG. 3c already described above, so that a more detailed description of FIG. 4a may be dispensed with here.

When the tautening cord 10 is in the pocket 6 in the position illustrated in FIG. 4a, the end portion 7a, 8a of the face elements 7, 8 fastened to the pocket 6 are arranged in the region of the end portion 22 of the sliding sleeve 20.

When the airbag is inflated further, the tautening cord 10 moves in the pocket 6 relative to the airbag in the free-running direction F, the tautening cord being tensioned further. The tensioning of a tautening cord during the inflation of an airbag is described in detail in DE 196 54 490 A1, to which reference is made in this respect. The present invention further provides for detaining the tautening cord 10 in its tensioned position after the inflation of the airbag.

As a result of movement in the free-running direction F during the inflation of the airbag, that portion of the tautening cord 10 which is provided with the face elements 17, 18 comes at least partially behind the sliding sleeve 20. This portion of the tautening cord eventually moves completely behind the sliding sleeve 20 as shown in FIG. 4b. After the inflation of the airbag, the portion of the tautening cord 10 which is provided with the face elements 17, 18 is located outside the sliding sleeve 20. In this position the rear ends of the face elements 17, 18 are arranged close behind the end portion 22 of the sliding element 20.

After the complete inflation of the airbag, the airbag tends to relax again. As a result, or due to the load exerted by an occupant intercepted by the airbag, relative movement of the pocket 6 in relation to the tautening cord 10 is triggered. The tautening cord 10 moves with its face elements 17, 18 relative to the lateral end region 5 of the airbag in the pocket 6 in the blocking direction S (opposite the free-running direction F).

As the tautening cord 10 moves in the blocking direction S, the sliding sleeve 20 is pushed in the blocking direction S as its deformable end region 22 (which forms an abutment 21) contacts the face elements 17, 18 as shown in FIG. 4b. When this contact occurs, the end portion 22 is deformed increasingly and is displaced further in the blocking direction S, as may be seen from FIGS. 4b and 4c.

At the same time, the end portions 7a, 8a of the face elements 7, 8 fastened to the pocket 6 and provided with hooks 9 come to rest against the associated face elements 17, 18 of the tautening cord 10. Interlocking of the pairs of adhesive faces 7, 17 and 8, 18 then takes place in the manner of a touch fastener. This interlocking preventing further movement of the tautening cord 10 relative to the pocket 6 in the blocking direction S. This blocking action is also assisted by the deformation of a sliding sleeve 20, shown in FIG. 4c. The funnel-shaped design of the pocket 6 further enhances the mutual distortion of the sliding sleeve 20 and the face elements 7, 8.

The end portions 7a, 8a of the airbag-side face elements 7, 8 which rest on the tautening-cord-side face elements 17, 18 are folded. As a result, hooks 9 are located on both the pocket side and the cord side of the face elements 7, 8. This arrangement ensures that the hooking together of the pairs of adhesive faces 7, 17, 8, 18 persists even in the event of the overturning of the end regions 7a, 8a. Moreover, a reinforcement of the end regions 7a, 8a can be achieved by the doubling and, if necessary, by further elements. This arrangement ensures that there is large-area engagement between the face elements 7, 8 of the pocket 6 and the face elements 17, 18 of the tautening cord 10.

The structure described above provides a return stop for the cord thereby ensuring that, after the inflation of the airbag, the tautening cord does not relax due to movement in the direction S. Both the tautening cord and the airbag continue to remain tautened even after the conclusion and the inflation of the airbag.

Figure 5A:
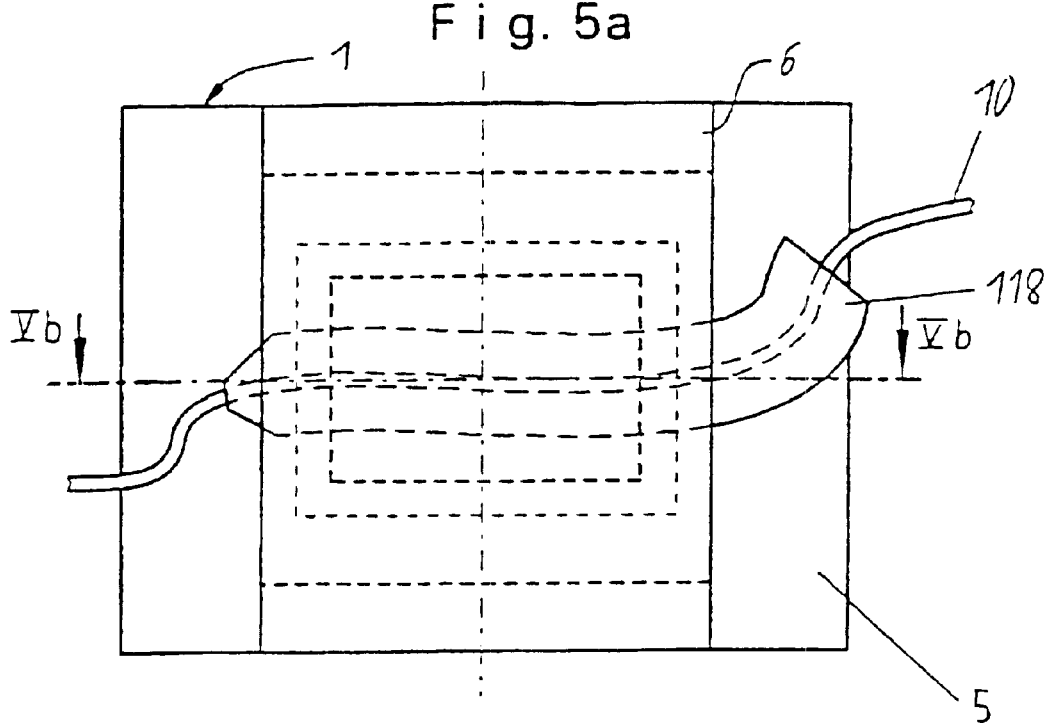
FIG. 5a shows a side view of a modification of the exemplary embodiment from FIGS. 3a to 3d.
Figure 5B:
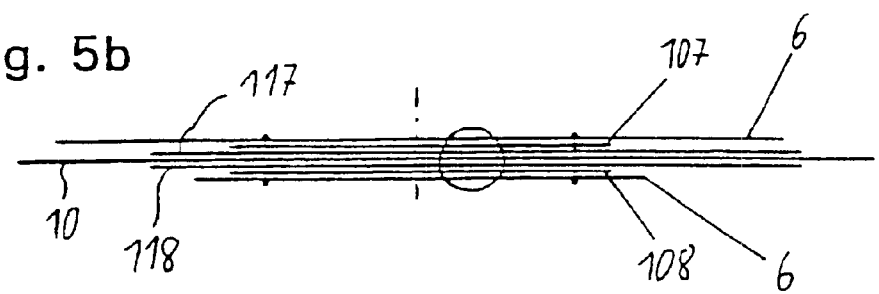
Figure 5C:
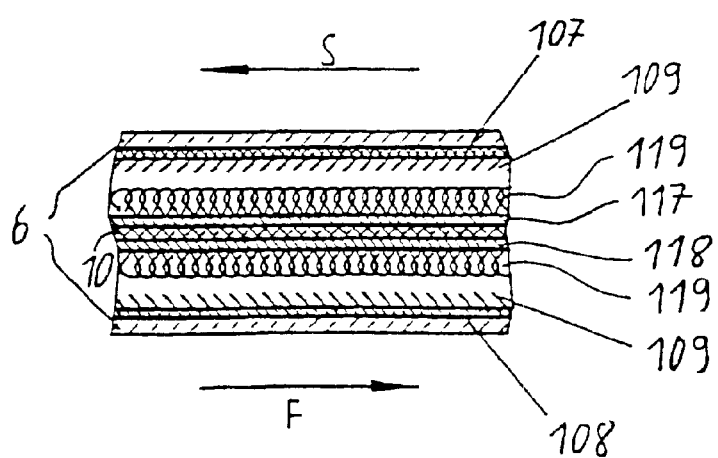
FIG. 5c shows a detail of the illustration according to FIG. 5b.

A further exemplary embodiment of the invention is illustrated with reference to FIGS. 5a to 5c. In this case, the tautening cord 10 has an identical design to that of the exemplary embodiment according to FIGS. 3 and 4. In particular, the tautening cord 10 has arranged on it two face elements 117, 118, adhesive loop faces 119 of which serve for forming a pair of loop faces with a corresponding hook face. Each of the face elements 117, 118 is accordingly assigned a corresponding face element 107, 108, provided with hooks 109, on the inside of the pocket 6 of the airbag 1.

In this case, the hooks 109 of the face elements 107, 108 of the pocket 6 run at an inclination to the tautening cord 10 such that the tautening cord 10 can readily move relative to the pocket 6 in the free-running direction F. By contrast, no movement of the tautening cord 10 in the pocket 6 is possible in the opposite direction (blocking direction S). During movement of the cord 10 in the direction S, the hooks 109 of the face elements 107, 108 engage into the corresponding counterfaces (loops 119) of the face elements 117, 118 provided on the tautening cord 10. The same interlocking action as in the exemplary embodiment of the invention illustrated with reference to FIGS. 3 and 4 is therefore achieved by other means.

As a result of the solution according to the invention, when applied to a lateral airbag, it is possible, in particular, to prevent a situation where, in the event of an accident, a vehicle occupant may be thrown out of an open window or a window destroyed during the accident.

At the same time, however, there is the problem that rescue work may be impeded by the persistent tautening of the tautening cord and of the airbag. In particular, it may become considerably more difficult to rescue vehicle occupants through a vehicle door or window.

In order to eliminate this problem, various mechanisms may be envisioned, by which, if required, the tension can be removed from the tautening cord. Various exemplary embodiments of this kind are illustrated in FIGS. 6a to 6d.

According to FIG. 6a, the tautening cord consists of two portions 10a, 10b which are connected to one another by a plastic element 35 provided with a predetermined breaking point 36. The predetermined breaking point 36 may be configured so that the plastic element 35 can withstand the forces occurring on the tautening cord during the inflation of the airbag. However, if an attempt is made with greater forces to open the vehicle door or to remove the airbag from the windowpane, the plastic element 35 breaks at the predetermined breaking point 36 and the tautening cord 10 is removed as an obstacle.

The same effect may be achieved if the tautening cord 10 is provided with a perforation 31, as shown in FIG. 6b. Alternatively, as shown in FIG. 6c, two portions 10a, 10b which are sewn to one another along a seam 33 may be provided. The perforation 31 or the seam 33 are capable of withstanding the forces occurring during the inflation of the airbag. However, by appropriately greater forces being exerted, the tautening cord 10 tears in the region of the perforation 31 or of the seam 33.

According to FIG. 6d, the tautening cord 10 is fastened to the vehicle body 4 at a fastening point 11 via a fastening element 40 which has a predetermined breaking point 41. This arrangement is configured in such a way that it can withstand the forces occurring on the tautening cord 10 during the inflation of the airbag, while, under appropriately greater forces, the fastening element 40 breaks at the predetermined breaking point 41.

In a further exemplary embodiment according to FIG. 7, the tautening cord consists, again, of two portions 10a, 10b which are connected to one another by a hook and loop or touch fastener 38. Furthermore, one portion 10a of the tautening cord may include a pull tape 39, for releasing the fastener 38 in an emergency.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An air bag unit comprising:
   an inflatable airbag;
   a cord operatively connected to the airbag, wherein the cord is arranged to be tautened during inflation of the airbag to thereby limit the spread of the airbag;
   a first adhesive face connected to the cord;
   a second adhesive face connected to the airbag;
   wherein the adhesive faces are configured to allow relative movement between the airbag and the cord in a first direction during inflation of the airbag; and
   wherein the first adhesive face is configured to engage the second adhesive face to prevent relative movement between the airbag and the cord in a second direction generally opposite to the first direction after inflation of the airbag.

2. The airbag unit of claim 1, wherein the adhesive faces form a touch fastener.

3. The airbag unit of claim 2, wherein one of the faces includes inclined hooks arranged so that the hooks slide over the other face during the relative movement of the cord and airbag in the first direction and engage with the other face during the relative movement of the cord and airbag in the second direction.

4. The airbag unit of claim 1, further comprising a sliding element positioned between the two adhesive faces; wherein the sliding element is configured to deform during relative movement of the cord and airbag in the second direction to permit the two faces to engage.

5. The airbag unit of claim 4, wherein the first adhesive face and sliding element are arranged so that during relative movement between the cord and the airbag in the first direction a portion of the first face moves past an end of the sliding element, and during relative movement between the cord and the airbag in the second direction, the first face contacts the sliding element to cause deformation of the sliding element.

6. The airbag unit of claim 5, wherein the sliding element includes an abutment positioned to be contacted by the first face during deformation of the sliding element.

7. The airbag unit of claim 4, wherein the sliding element is positioned so that during the inflation of the airbag, the sliding element is pressed by the second face against the first face.

8. The airbag unit of claim 4 wherein the sliding element comprises a sleeve.

9. The airbag unit of claim 1, wherein the first adhesive face is one of a pair of adhesive faces connected to the tautening cord, and wherein each of the pair of faces are positioned to engage a corresponding adhesive face on the airbag.

10. The airbag unit of claim 1, wherein the airbag includes a pocket containing the second adhesive face.

11. The airbag unit of claim 1, wherein the tautening cord is connected to the airbag.

12. The airbag unit of claim 1, further comprising means for removing tension from the tautening cord after the inflation of the airbag.

13. The airbag unit of claim 12, wherein the means for removing tension includes a region of the tautening cord having lower strength; wherein the region having lower strength can withstand the forces occurring during the inflation of the airbag without breaking.

14. The airbag unit of claim 13, wherein the region includes a predetermined breaking point.

15. The airbag unit of claim 12, wherein the means for removing includes a releasable fastener.

16. The airbag unit of claim 15, wherein the releasable fastener comprises two parts of the tautening cord connected together.

17. The airbag unit of claim 15, wherein the releasable fastener comprises a connection between the tautening cord and a fixed structural element.

* * * * *